United States Patent
Besset-Bathias

(10) Patent No.: US 7,035,263 B1
(45) Date of Patent: Apr. 25, 2006

(54) METHOD FOR GENERATING ATM CELLS FOR LOW BIT RATE APPLICATIONS

(75) Inventor: Claire Besset-Bathias, Neuilly sur Seine (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/429,028

(22) Filed: Oct. 29, 1999

(30) Foreign Application Priority Data

Jun. 30, 1999 (FR) .................................. 99 401628

(51) Int. Cl.
*H04L 12/28* (2006.01)
*H04L 12/56* (2006.01)

(52) U.S. Cl. .................... 370/395.4; 370/232; 370/468; 370/395.42

(58) Field of Classification Search ............. 370/395.1, 370/395.4, 395.42, 395.43, 412, 468, 230, 370/418, 416, 444, 414, 232, 235, 395.2
See application file for complete search history.

(56) References Cited

U.S. PATENT DOCUMENTS

| | | | | |
|---|---|---|---|---|
| 5,802,051 A | * | 9/1998 | Petersen et al. | ....... 370/395.42 |
| 5,809,023 A | * | 9/1998 | Petersen et al. | ......... 370/395.1 |
| 5,940,397 A | * | 8/1999 | Gritton | ........................ 370/412 |
| 6,018,517 A | * | 1/2000 | Bengio et al. | ............... 370/233 |
| 6,249,511 B1 | * | 6/2001 | Kado | .......................... 370/232 |
| 6,256,310 B1 | * | 7/2001 | Kim et al. | ............. 370/395.43 |
| 6,331,981 B1 | * | 12/2001 | Harth | ....................... 370/395.1 |
| 6,404,767 B1 | * | 6/2002 | Depelteau | ................ 370/395.1 |
| 6,434,154 B1 | * | 8/2002 | Stacey et al. | .......... 370/395.64 |
| 6,538,992 B1 | * | 3/2003 | Subbiah et al. | ............. 370/230 |

FOREIGN PATENT DOCUMENTS

EP    0 901 301 A2    3/1999

OTHER PUBLICATIONS

Zhou S. H. et al.: "Bypassing Vocoders in CDMA Mobile-to-Mobile Calls" VTC ';98, 48th IEEE Vehicluar Technology Conference. Pathway to a Global Wireless Revolution (CAT. No. 98CH36151), VTC '98 Ottawa, Ont., Canada, May 18-21, 1998, pp. 2527-2531 vol. 3, XP002116286 1998, New York, NY, USA, IEEE, USA ISBN: 0-7803-4320-4.

(Continued)

*Primary Examiner*—Ajit Patel
*Assistant Examiner*—Chirag Shah
(74) *Attorney, Agent, or Firm*—Sughrue Mion, PLLC

(57) ABSTRACT

A method for generating ATM cells for low bit rate applications, said method including a step of scheduling ATM cell transmission times in a way as to keep ATM cell spacing as constant as possible, and a step of multiplexing a plurality of low bit rate connections into a same ATM connection having the thus scheduled ATM cell transmission times.

11 Claims, 1 Drawing Sheet

OTHER PUBLICATIONS

Almesberger, W. et al.: "Using Quality of Service Can Be Simple: Arequipa with Renegotiable ATM connections" Computer Networks and ISDN Systems, vol. 30, No. 24, pp. 2327-2336, XP004150558.

Rhee, W-S, et al.: Interoperability Mechanism of ABR/ABT Capability in ATM Public Networks, IEEE International Conference on Communications (ICC), US., New York IEEE, p. 745-749, XP000742040 ISBN:L 0-7803-3926-6.

Wallmeier, E. et al.: "The Spacing Policer an Algorithm for Efficient Peak BIT Rate Control In Atm Networks" Proceedings of the International Switching Symposium, JP, Tokya, IEICE, col. Symp. 14, p. 22-26, XP0003373695.

* cited by examiner

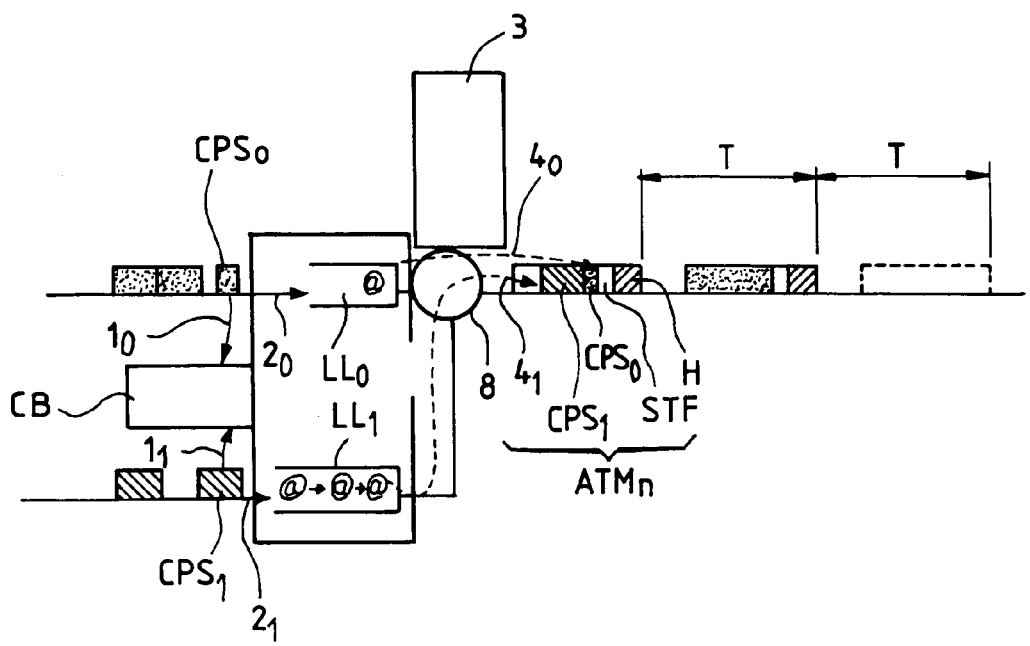
FIG_1
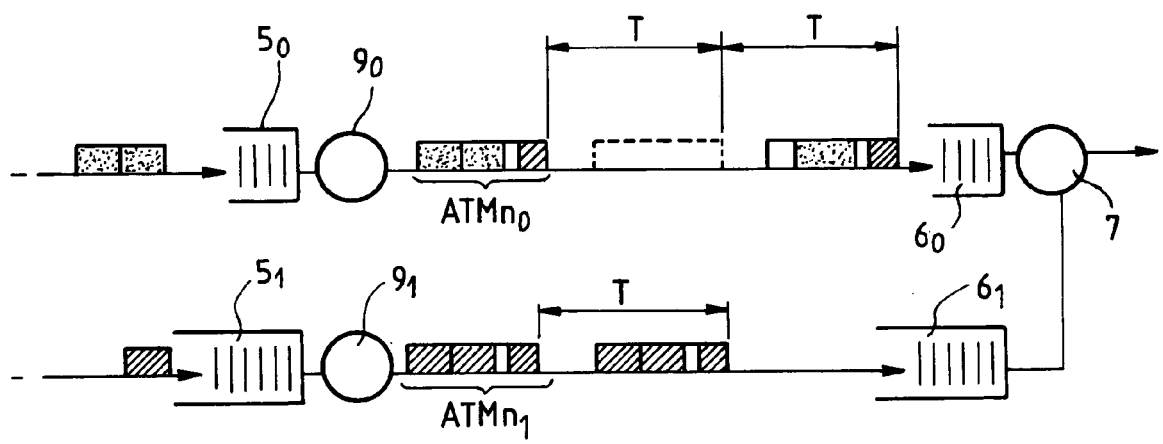
FIG_2

METHOD FOR GENERATING ATM CELLS FOR LOW BIT RATE APPLICATIONS

BACKGROUND OF THE INVENTION

The present invention is generally concerned with telecommunication systems.

The present invention is more particularly concerned with telecommunication systems using ATM (Asynchronous Transfer Mode). ATM is a commonly used standard for transmission of high bit rate data in telecommunication systems, which is based on an asynchronous time multiplexing of packets of fixed length called cells.

Telecommunication systems using ATM may be modelized by an ATM layer and an interface layer, or ATM Adaptation Layer (AAL), between the ATM layer and users.

A specific ATM Adaptation Layer has been provided for low bit rate applications such as in particular mobile communication systems, especially third generation mobile communication systems (such as in particular UMTS: "Universal Mobile telecommunication System").

Such a specific layer, or AAL2, is defined in ITU-T Recommendation I.363.2. AAL2 is subdivided into a Service Specific Convergence Sublayer (SSCS) and a Common Part Sublayer (CPS) which allows several low bit rate connections to share a same ATM connection, by multiplexing several short packets called CPS packets into a same ATM cell.

To be efficient, the process carried out at CPS level should simultaneously achieve a number of objectives, in particular:

this process should be bandwidth efficient, i.e. ATM cells should be sent with as least padding as possible,
this process should meet quality of service requirements, in particular it should introduce as least delay variations as possible,
this process should meet different quality of service requirements for the different types of traffic to be multiplexed; in particular voice traffic is time sensitive and requires stringent delay variations objectives, while data or signalling traffic are usually tolerant to transfer delay variations.

A currently used solution is the following. If an ATM cell is complete with CPS packets before the expiration of a timer delay, it is sent out immediately; otherwise it is sent out (completed with padding) as soon as this timer delay expires. In other words, this solution ensures that CPS packets wait at most the duration of the timer before being scheduled for transmission.

Though this solution reduces the waiting time of CPS packets, it still has the drawback of introducing some delay variations.

The present invention is based on a different approach, enabling in particular to avoid such a drawback.

SUMMARY OF THE INVENTION

An object of the present invention is therefore a method for generating ATM cells for low bit rate applications, said method including a step of scheduling ATM cell transmission times in a way as to keep ATM cell spacing as constant as possible, and a step of multiplexing a plurality of low bit rate connections into a same ATM connection having the thus scheduled ATM cell transmission times.

According to another object of this invention, said ATM cell spacing is kept as close as possible to a cell rate negociated for the corresponding ATM connection.

Cell rate is a currently known parameter of a traffic agreement negociated for data transfer in ATM networks. Control of compliance with the negociated cell rate is usually performed in transit nodes of an ATM network, by compensating for cell delay variations occuring during transit in this network. On the contrary, the present invention is carried out in a source node. Indeed, the present invention is concerned with a mode of generation of ATM cells which may, in itself, introduce cell delay variations. Ensuring compliance with the negociated cell rate, as from the source, therefore constitutes a simple and efficient way of avoiding such delay variations, while at the same time simplifying traffic management in the network.

Depending on the type of traffic agreement for the ATM connection, and according to various embodiments of the present invention, cell rate may be:

a PCR (Peak Cell Rate) in the case of service category of DBR (Deterministic Bit Rate) or CBR (Constant Bit Rate) type,
a BCR (Block Cell Rate) in the case of service category of ABT (ATM Block Transfer) type,
a ACR (Allowed Cell Rate) in the case of service category of ABR (Available Bit Rate) type.

According to another embodiment, said negociated cell rate may be re-negociated, to optimise resource utilisation in the network.

According to another object of this invention, no ATM cell is sent when there is no data available from any of said low bit rate connections, and said method includes a step of referencing said scheduling of ATM cell transmission times with respect to the next availability of data from at least one of said low bit rate connections.

According to another object of this invention, said low bit rate connections are assigned different priorities, and said multiplexing step includes an intra-priority multiplexing for multiplexing low bit rate connections of same priority, and an inter-priority multiplexing for multiplexing low bit rate connections of different priorities.

According to a first embodiment of the present invention, said intra-priority multiplexing and said inter-priority multiplexing are both carried out at ATM Adaptation Layer (AAL) level.

According to a second embodiment of the present invention, said intra-priority multiplexing is carried out at ATM Adaptation Layer (AAL) level and said inter-priority multiplexing is carried out at ATM Layer level.

Another object of the present invention is a device for generating ATM cells for low bit rate applications, said device including means for scheduling ATM cell transmission times in a way as to keep ATM cell spacing as constant as possible, and means for multiplexing a plurality of low bit rate connections into a same ATM connection having the thus scheduled ATM cell transmission times.

The present invention also has for its object an entity such as a base station (or Node B in UMTS) of a mobile radiocommunication network, comprising such a device.

The present invention also has for its object an entity such as a base station controller (or Radio Network Controller or RNC in UMTS) of a mobile radiocommunication network, comprising such a device.

BRIEF DESCRIPTION OF THE DRAWINGS

These and other objects of the present invention will become more apparent from the following description taken in conjunction with the accompanying drawings:

FIG. 1 is a diagram intended to illustrate a first embodiment of a method according to the present invention, FIG. 2 is a diagram intended to illustrate a second embodiment of a method according to the present invention.

MORE DETAILED DESCRIPTION OF THE INVENTION

As an example, this description will be made for the case of different quality of service requirements, i.e. different priorities, for the different types of low bit rate connections (or AAL2 connections) to be multiplexed onto the same ATM connection.

Still as an example, this description corresponds to the case of two streams of CPS packets to be multiplexed into a same ATM connection, one corresponding to real time, or high priority, traffic (for example speech traffic) and the other one corresponding to non real time, or low priority, traffic (such as for example data traffic or signalling). In the following, index 0 will be used for high priority traffic, and index 1 will be used for low priority traffic.

It should however be noted that the present invention is not limited to such examples, and other examples may be derived from the following description.

The first embodiment of the present invention, illustrated in FIG. 1, corresponds to the case where both inter-priority and intra-priority multiplexing are carried out at ATM Adaptation Layer (AAL) level.

The following notations will be used hereinafter:

T: ATM emission interval (or ATM cell rate)

AST: ATM Scheduling Time (or ATM cell scheduled transmission time)

$LL_0$: linked list of high priority (contains all the addresses of high priority CPS packets competing for packing into ATM cells)

$LL_1$: linked list of low priority of re-emission (contains all the addresses of low priority CPS packets competing for packing into ATM cells)

$SLI_i$: Sum of Length Indicators (or sum of the lengths of all CPS packets of linked list $LL_i$)

As illustrated in FIG. 1, when a CPS packet, such as the ones illustrated at $CPS_0$ or $CPS_1$, arrives, it is stored in a common buffer noted CB, as illustrated at $1_0$ or $1_1$.

Besides, as illustrated at $2_0$ or $2_1$, a pointer to this CPS packet (or address, noted @, of this CPS packet in the common buffer CB) is inserted in a corresponding FIFO memory, or linked list, $LL_0$ or $LL_1$.

Besides, a new value of $SL_i$ is determined, in computation means noted 3, using the following relation:

$$SLi = SLi + LIi$$

where LIi is the length of the received CPS packet (indicated by a corresponding field of CPS packets).

Let AST be a current ATM cell scheduled transmission time.

At each scheduled cell transmission time AST, linked lists $LL_0$ and $LL_1$ are served according to their respective priority and an ATM cell is filled accordingly. In other words, every ATM cell scheduled transmission time:

If $SLI_0 \geq 47$ octets (i.e. if $SLI_0 \geq$ number of octets of an ATM cell payload), the addresses in the common buffer of the first received 47 octets of high priority are read in linked list $LL_0$, the common buffer CB is "emptied" from these 47 first octets, $SLI_0$ is set to $SLI_0-47$, and these octets are mapped into an ATM cell (no padding in this case).

If $SLI_0 < 47$ octets (with $SLI_0 = x$), the addresses in the common buffer of the "x" first received octets of high priority are read in linked list $LL_0$, the common buffer CB is "emptied" from these "x" octets, and $SLI_0$ is set to $SLI_0 = 0$. Then:

If $SLI_1 = 0$, i.e. if there are no low priority packets to fill the cell, these "x" octets are mapped into the ATM cell and padding is used in this case to fill the cell, If $SLI_1 > 0$ and $SLI_1 \geq 47-x$, the addresses in the common buffer of the first $47-x$ received octets of low priority are read in linked list $LL_1$, the common buffer CB is "emptied" from these octets, $SLI_1$ is set to $SLI_1 = SLI_1 - (47-x)$, and these "x" and $47-x$ octets are mapped into the ATM cell (no padding in this case)

If $SLI_1 > 0$ and $SLI_1 < 47-x$ (with $SLI_1 = y$), the common buffer is emptied from the corresponding "y" octets, $SLI_1$ is set to 0, and these "x" and "y" octets are mapped into the ATM cell (padding is used in this case to fill the cell).

If a partial CPS packet of low priority is sent, the address of this CPS packet is linked in the high priority linked list (it must be the first packet to be sent in the next ATM cell).

This process is performed at each scheduled ATM cell transmission time by multiplexing means noted 8 which are schematically illustrated as mapping the selected octets into ATM cells such as $ATM_n$, as shown at $4_0$ or $4_1$. An ATM cell such as for example $ATM_n$ is currently composed of a header field, noted H, a so-called STF field, and CPS packets such as $CPS_0$, $CPS_1$ in this example. Besides, at each scheduled ATM cell transmission time AST, if after this process the two linked lists $LL_0$ and $LL_1$ are empty, i.e. if no CPS packet is available for transmission in ATM cells, no new AST is scheduled, i.e. no new ATM cell is sent. Otherwise, if at least one of the two lists is not empty, a new AST is scheduled. Generally this new AST is determined so as to keep the ATM cell spacing as constant as possible. Advantageously AST may be computed using the following relation:

$$AST = AST + T$$

where T is the cell rate negociated for the corresponding ATM connection.

As already indicated, ensuring compliance with the negociated cell rate constitutes a simple and efficient way of avoiding delay variations, while at the same time simplifying traffic management in the network.

Besides, depending on the type of traffic agreement for the ATM connection, and according to various embodiments of the present invention, cell rate may be:

a PCR (Peak Cell Rate) in the case of service category of DBR (Deterministic Bit Rate) or CBR (Constant Bit Rate) type, a BCR (Block Cell Rate) in the case of service category of ABT (ATM Block Transfer) type, a ACR (Allowed Cell Rate) in the case of service category of ABR (Available Bit Rate) type.

Besides, cell rate may be re-negociated to optimize resource utilisation in the network; in other words ATM cell spacing may be dynamically determined.

In particular, cell rate of the ATM connection may be re-negociated:

at set up or release of an AAL2 connection, when the utilisation of the ATM connection goes over a given threshold (upper re-negociation), or under a given threshold (lower re-negociation), every transmission time interval, as a function of the total AAL2 traffic to be conveyed.

Besides, in the case where a new CPS packet arrives at a time "t" where both linked lists $LL_0$ and $LL_1$ are empty, i.e. in the case of a next availability of a CPS packet for transmission in ATM cells, further to a period of non availabilty, AST may be computed in the following way:

if $AST+T \leq t$, $AST=t$ if $AST+T>t$, $AST=AST+T$

In other words, AST=t may be considered as serving as a new reference for the computation of a new AST according to relation AST=AST+T used otherwise.

Computation means such as for example the computation means 3 may be used for scheduling the ATM cell transmission times according to such a method.

The second embodiment of the present invention, illustrated in FIG. 2, corresponds to the case where said intra priority multiplexing is carried out at ATM Adaptation Layer (AAL) level, and said inter-priority multiplexing is carried out at ATM Layer level.

The method illustrated in FIG. 2 thus differs from the one illustrated in FIG. 1 in that two types of ATM cells are created by intra-priority multiplexing (i.e. by multiplexing of CPS packets of the same priority), each type corresponding to a type of traffic priority, and these two types of ATM cells are multiplexed into an ATM connection at ATM layer level. A first type of ATM cells, such as the one noted $ATM_{n0}$ in FIG. 2, corresponds to high priority traffic, and a second type of ATM cells, such as the one noted $ATM_{n1}$ in FIG. 2, corresponds to low priority traffic.

The formation of each of these two types of ATM cells uses queuing means, respectively $5_0$, $5_1$ multiplexing means that do not apply any traffic priority criteria, respectively $9_0$, $9_1$.

ATM cell transmission times for each of these two types of cells are scheduled according to the same principle than disclosed above, i.e. in a way as to keep ATM cell spacing as constant as possible, preferably as close as possible to a cell rate negociated for the ATM connection. Though not illustrated in detail, this may be derived from the embodiment of FIG. 1, by considering the case of one type of traffic only.

Multiplexing of such ATM cells at the ATM layer level uses queuing means $6_0$, $6_1$ and multiplexing means 7 that do apply traffic priority criteria.

A method or a device for generating ATM cells for low bit rate applications may in particular be used in mobile communication systems, in particular:

in a base station, or Node B in UMTS, for multiplexing low bit rate traffic from a plurality of sources into a same ATM connection, for transmission to a base station controller, in a base station controller, or Radio Network Controller (RNC) in UMTS, for multiplexing low bit rate traffic from a plurality of sources into a same ATM connection, for transmission to a base station.

The invention claimed is:

1. A method for generating ATM cells for low bit rate applications, said method comprising:

scheduling transmission times for ATM cells in a way that as long as there is data available from at least one of a plurality of low bit rate connections, the transmission times are spaced according to a cell rate negotiated for a corresponding ATM connection; and multiplexing the low bit rate connections into the ATM connection so that the ATM cells are transmitted at scheduled transmission times.

2. The method according to claim 1, wherein said cell rate is a Peak Cell Rate PCR in the case of service category of DBR, or Deterministic Bit Rate, or CBR, or Constant bit Rate, type.

3. The method according to claim 1, wherein said cell rate is a Block Cell Rate BCR in the case of service category of ABT, or ATM Block Transfer, type.

4. The method according to claim 1, wherein said cell rate is an Allowed Cell Rate ACR in the case of service category of ABR, or Available Bit Rate, type.

5. A method according to claim 1, wherein said cell rate may be re-negotiated.

6. The method according to claim 1, wherein no ATM cell is sent when there is no data available from any of said low bit rate connections, and said method includes a further step of referencing said scheduling step with respect to the next availability of data from at least one of said low bit rate connections.

7. The method according to claim 1, wherein said low bit rate connections are assigned different priorities, and said multiplexing step includes an intra-priority multiplexing for multiplexing low bit rate connections of the same priority, and an inter-priority multiplexing for multiplexing low bit rate connections of different priorities.

8. The method according to claim 7, wherein said intra-priority multiplexing and said inter-priority multiplexing are both carried out at ATM Adaptation Layer level.

9. A device for generating ATM cells for low bit rate applications, said device comprising:

means for scheduling transmission times for ATM cells in a way that as long as there is data available from at least one of a plurality of low bit rate connections, the scheduled transmission times are spaced according to a cell rate negotiated for a corresponding ATM connection; and means for multiplexing the low bit rate connections into the ATM connection so that the ATM cells are transmitted at scheduled transmission times.

10. A base station for a mobile radio communication network, comprising a device for multiplexing low bit rate traffic from a plurality of sources into a same ATM connection for transmission to a base station controller, said device comprising:

means for scheduling transmission times for ATM cells in a way that as long as there is data available from at least one of a plurality of low bit rate connections, the scheduled transmission times are spaced according to a cell rate negotiated for a corresponding ATM connection and in a way as to keep ATM cell spacing as constant as possible; and means for multiplexing the low bit rate connections into the ATM connection so that the ATM cells are transmitted at the scheduled transmission times.

11. A base station controller for a mobile radio communication network, comprising a device for multiplexing low bit rate traffic from a plurality of sources into a same ATM connection, for transmission to a base station, said device comprising:

means for scheduling transmission times for ATM cells in a way that as long as there is data available from at least one of a plurality of low bit rate connections, the scheduled transmission times are spaced according to a cell rate negotiated for a corresponding ATM connection; and means for multiplexing the low bit rate connections into the ATM connection so that the ATM cells are transmitted at the scheduled transmission times.

* * * * *